United States Patent [19]
Nakano

[11] Patent Number: 5,619,252
[45] Date of Patent: Apr. 8, 1997

[54] VIDEO TELEPHONE SYSTEM AND METHOD FOR TRANSMITTING AND RECEIVING SIGNALS WHEN THERE IS A FAILURE IN THE SYSTEM

[75] Inventor: Misao Nakano, Hachinohe, Japan

[73] Assignee: Fujitsu Limited, Kawasaki, Japan

[21] Appl. No.: 636,890

[22] Filed: Apr. 24, 1996

Related U.S. Application Data

[63] Continuation of Ser. No. 522,534, Sep. 1, 1995, abandoned, which is a continuation of Ser. No. 225,354, Apr. 8, 1994, abandoned, which is a continuation of Ser. No. 931,447, Aug. 20, 1992, abandoned, which is a continuation of Ser. No. 550,685, Jul. 10, 1990, abandoned.

[30] Foreign Application Priority Data

Jul. 20, 1989  [JP]  Japan ..................................... 1-188131

[51] Int. Cl.⁶ ............................................. H04M 11/00
[52] U.S. Cl. .................. 348/14; 348/17; 379/96; 379/279; 370/216
[58] Field of Search ...................... 379/96, 94, 98, 379/100, 2, 32, 279; 348/14, 15, 17; 371/8.1, 8.2

[56] References Cited

U.S. PATENT DOCUMENTS

| | | | |
|---|---|---|---|
| 4,575,584 | 3/1986 | Smith et al. | 379/279 |
| 4,653,088 | 3/1987 | Budd et al. | 379/165 |
| 4,797,914 | 1/1989 | Vaello | 379/96 |
| 4,853,949 | 8/1989 | Schorr et al. | 379/2 |
| 4,887,158 | 12/1989 | Guichard et al. | 348/17 |
| 5,164,982 | 11/1992 | Davis | 379/96 |

OTHER PUBLICATIONS

Computers and Communication, "NEC 64kb TV Telephone" Apr. 24, 1989.

*Primary Examiner*—Ahmad F. Matar
*Attorney, Agent, or Firm*—Staas & Halsey

[57] ABSTRACT

A video telephone system which automatically switches during a normally operating communicating function to a minimum voice signal and a sub-power source when a master power source fails, and automatically switches back to the normally operating communicating function when the failure is remedied. The system includes first CODEC equipment which encodes a voice signal input from voice input-output equipment, and outputs various signals. Image pickup equipment receives an image signal and display equipment displays the image signal. The first CODEC equipment, the image pickup equipment and the display equipment function as voice and image signal encoding and decoding equipment. Second CODEC equipment encodes an input voice signal from the voice input-output equipment and outputs various signals. Line control equipment selectively outputs a signal input from the first or second CODECs for controlling switching of the first and second CODECs to the transmission path. Switching control equipment inputs a signal indicating the condition of the master power source, outputs a control signal in accordance with the input signal, and automatically controls voice communication by switching the first and second CODECs if the master power source fails.

2 Claims, 3 Drawing Sheets

VIDEO TELEPHONE SYSTEM AND METHOD FOR TRANSMITTING AND RECEIVING SIGNALS WHEN THERE IS A FAILURE IN THE SYSTEM

This application is a continuation, of application No. 08/522,534, filed Sep. 1, 1995, now abandoned; which is a continuation of application No. 08/225,354, filed Apr. 8, 1994, now abandoned; which is a continuation of application No. 07/931,447, filed Aug. 20, 1992, now abandoned, which is a continuation of application No. 07/550,685, filed Jul. 10, 1990, now abandoned.

BACKGROUND OF THE INVENTION

1. Field of the Invention

The present invention relates to a video telephone and particularly to a video telephone for transmitting and receiving video signals and voice signals through an Integrated Services Digital Network (ISDN). Moreover, the present invention relates to a method for controlling the transmission and reception of signals when a power supply of the video telephone fails.

2. Description of the Prior Art

A basic ISDN interface includes at least two B channels and one D channel. The B channel currently used has a bit rate of 64 kbits/sec and the D channel has a bit rate of 16 kbits/sec. Communication between video telephones is carried out using an ISDN B channel.

A general communication method between video telephones will be explained. A video telephone system is usually provided with a video signal coder/decoder (CODEC) which encodes an input video signal to obtain a signal having a bit rate of 48 kbits/sec or decodes such signal into an image signal. A voice signal CODEC encodes an input voice signal to obtain a signal having a bit rate of 16 kbits/sec or decodes such signal into a voice signal. The data coded by the video signal and voice signal CODECs are multiplexed and the data is then transmitted as data having a bit rate of 64 kbits/sec to a distant video telephone system using the B channel. On the receiving side, the received data is decoded to obtain a voice signal and an image signal. Communication between video telephone systems can be realized through the signal transmission and reception explained above.

An ordinary telephone set is operated by a current supplied through a speed path and receives its power from telephone lines. A video telephone is operated, unlike the ordinary telephone set, by receiving its power from an external power source. The video telephone has high power consumption and the power supplied through telephone lines is insufficient. This is because the video telephone is provided with a monitor, camera and codec which require high speed encoding operations. The video telephone is also provided with a sub-power source which supplies power if the external power source fails.

Since, however, a sub-power source having a remarkably high power capacity is required for normal operation of a video telephone, the video telephone becomes large in size. In contrast, if a sub-power source having a low power capacity is used, and the video telephone does not function normally for a long period of time, the video telephone using the sub-power source cannot provide sufficient communication services.

SUMMARY OF THE INVENTION

It is an object of the present invention to realize communication between video telephones without providing a high power capacity battery as the sub-power supply within the video telephone.

It is another object of the present invention to provide a video telephone system which automatically realizes switching between communicating video telephones for normally operating the communication function of, at a minimum, a voice signal during power failure.

It is yet another object of the present invention to provide a video telephone system which automatically realizes switching between communicating video telephones and returning only the voice signal communication function to the communication function by multiplexing the image and voice signals of the video telephone in case the master power source recovers.

In a preferred embodiment of the present invention a video telephone can transmit and receive voice signals and image signals using the following structure.

The basic structure of the present invention comprises voice input-output equipment for inputting or outputting a voice signal, image pickup equipment for obtaining an image signal and display equipment for displaying an image signal.

The system also comprises first CODEC equipment for voice signal encoding and decoding equipment to be used when the master power source is not functioning and second CODEC equipment for voice and image signal encoding and decoding to be used when the master power source is normal. The first CODEC equipment encodes the voice signal from the voice input-output equipment during transmission, decodes a second signal having a bit rate M equal to 64 kbits/sec to be output or input as a first signal having the bit rate M and outputs a decoded third signal to the voice input-output equipment during reception. The second CODEC equipment encodes a voice signal input from the voice input-output equipment into a fourth signal having a bit rate N equal to 16 kbits/sec. The second CODEC equipment also encodes an image signal input from image pickup equipment into a fifth signal having a bit rate L equal to 48 kbits/sec, and decodes the second signal having the bit rate M to be output or input as a sixth signal having the bit rate M (=L+N) by multiplexing the fourth and fifth signals during transmission. The second CODEC equipment then outputs the decoded voice signal to the voice input-output equipment and outputs the encoded image signal to the display equipment.

In addition, the video telephone of the present invention further comprises line control equipment which selectively outputs the signal input from the first CODEC or second CODEC equipment. Line control equipment switches the first and second CODECs to a transmission line in accordance with an input control signal or outputs the signal input from the transmission line to the first CODEC equipment or the second CODEC equipment in accordance with the input control signal. Switching control equipment receives a signal indicating the condition of the master power source and outputs a control signal in accordance with the input signal.

DESCRIPTION OF THE PREFERRED EMBODIMENT

Figure 1:
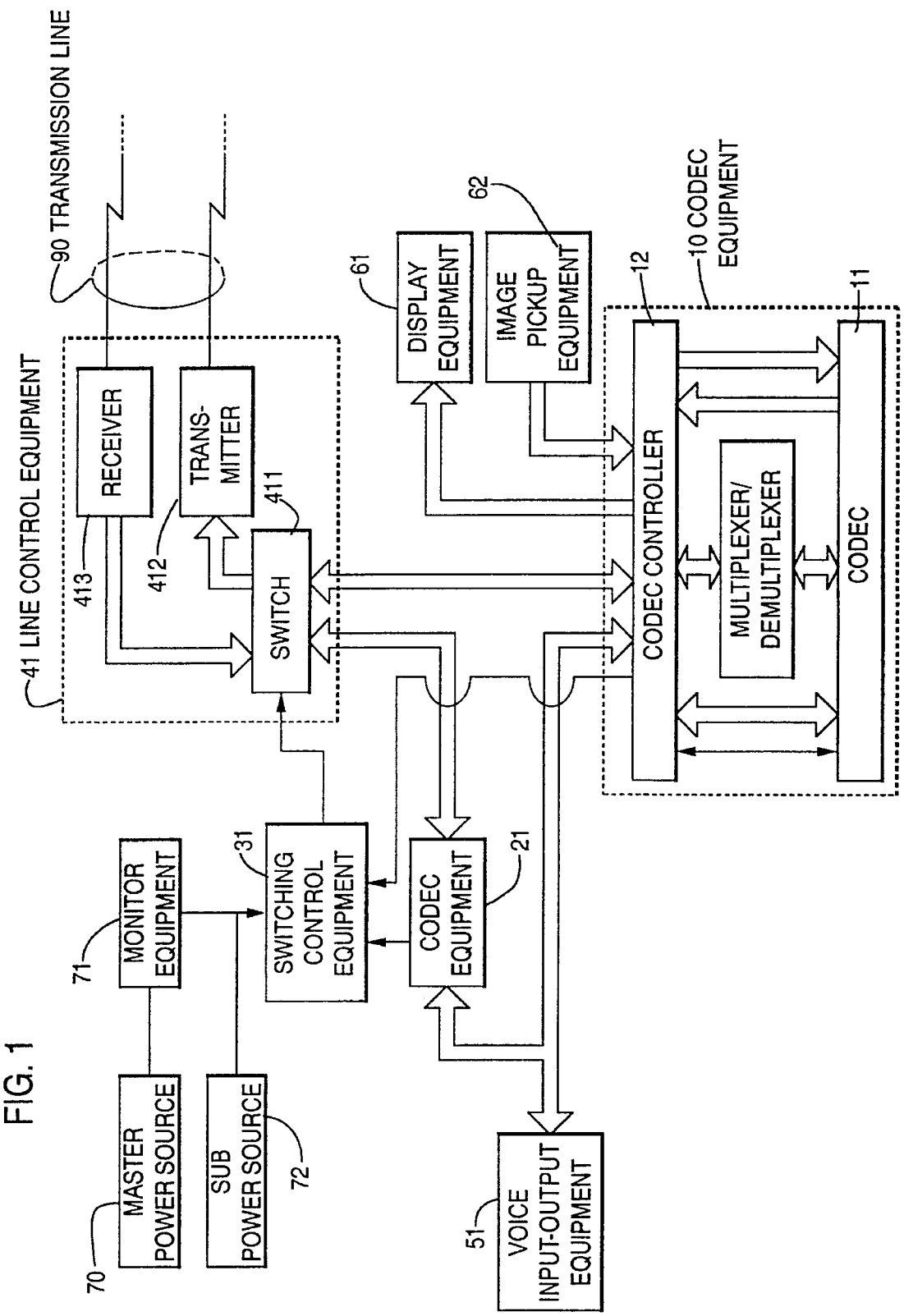
FIG. 1 is a block diagram of a video telephone system according to the present invention.

An embodiment of the present invention will be explained in detail. It should be noted that like elements are designated by like reference numerals throughout the drawings.

A video telephone will be explained in detail with reference to FIG. 1. In FIG. 1, reference numeral 10 designates CODEC equipment, and reference numeral 11 designates CODEC equipment having an image CODEC function for encoding an input image signal into a signal having a bit rate of 48 kbits/sec and inversely decoding the input image signal and a voice CODEC function to encode an input voice signal into a signal having a bit rate of 16 kbits/sec. The CODEC equipment 10 has a power consumption of 50 W.

Reference numeral 12 designates a CODEC controller for controlling input and output signals to and from the CODEC equipment 11. Reference numeral 21 designates voice CODEC equipment which encodes an input voice signal into a signal having a bit rate of 64 kbits/sec and inversely decodes the signal. The voice CODEC equipment 21 has a power consumption of 0.1 W. Reference numeral 31 designates switching control equipment. Reference numeral 41 designates line control equipment comprising a switch 411 for selecting an output signal and an output line, a transmitter 412 for transmitting a signal and a receiver 413 for receiving a signal. The line control equipment shown in FIG. 1 has a minimum necessary structure.

Reference numeral 51 designates voice input-output equipment, reference numeral 61 designates display equipment, and reference numeral 62 designates image pickup equipment. Reference numeral 90 designates an ISDN transmission line, and reference numeral 70 designates a master power source which supplies electrical power to the video telephone and has a rated power of 77 W. Reference numeral 71 designates monitor equipment which always monitors the voltage of the master power source 70, and reference numeral 72 designates a sub-power source for supplying a rated power of 0.56 W in place of the master power source if the master power source 70 fails.

The line control equipment controls two kinds of operations depending on a control signal received from the switching control equipment 31:

(a) The CODEC controller 12 receives two kinds of signals having a bit rate of 64 kbits/sec and one signal is output from the CODEC equipment 21. The CODEC controller 12 is selected and a signal is then sent to the transmission line 90. A signal received on the transmission line 90 is sent to the CODEC controller 12; or (b) The CODEC equipment 21 receives two kinds of signals having a bit rate of 64 kbits/sec and one signal is output from the CODEC equipment 21. The CODEC controller 12 is selected and a signal is sent to the transmission line 90. A signal received on the transmission line is sent to the CODEC equipment 21.

The switching control equipment 31 outputs a control signal to request the line control equipment 41 to conduct the above-mentioned control operation (b) when a signal, which indicates the master power source 70 failed, is output from the monitor 71 which always monitors conditions of the master power source 70. Alternatively, the switching control equipment 31 outputs a control signal to request the line control equipment to conduct the above-mentioned control operation (b) when an error signal is output from the CODEC controller 12. Moreover, the switching control equipment 31 outputs a control signal to request the line control equipment 41 to conduct the control operation (a) when an error signal is output from the CODEC equipment 21. The CODECs 12 and 21 conduct error checks for synchronization or asynchronization of the input signal.

The video telephone generally extracts an image of a person or a desired image from a camera in addition to the voice signal and sends the image signal to the video telephone of a distant party. The video telephone can also receive an image signal and a voice signal from the distant party. Communication between video telephones is generally carried out using the B channel of the ISDN as already described above in the Description of the Prior Art. The transmission bit rate of current B channels is 64 kbits/sec. Therefore, the video telephone employs a format of transmitting the voice signal and image signal having a bit rate of 64 kbits/sec by multiplexing these signals. The embodiment of the present invention comprises a first voice CODEC 21 which generates a 64 kbits/sec signal by encoding and decodes a 64 kbits/sec input signal. The CODEC equipment 11 generates a 48 kbits/sec signal by encoding an image signal from image pickup equipment 62 and decoding a 48 kbits/sec input signal. The CODEC equipment 11 also generates a 16 kbits/sec signal by encoding a voice signal from voice input-output equipment 51 and decoding a 16 kbits/sec input signal. The 16 and 48 kbits/sec signals are multiplexed and demultiplexed by the CODEC equipment 11.

Normal operation will now be explained. During normal operation, a voice signal input from voice input-output equipment 51, for example, a microphone, and an image signal input from image pickup equipment 62, for example, a camera, are input to the CODEC equipment 11 by the CODEC controller 12. The voice signal and image signal are encoded in the CODEC controller 12 and are output to line control equipment 41. A signal obtained by encoding the voice signal is also sent to the line control equipment 41 from the CODEC equipment 21. During normal operation, the signal output from the monitor equipment 71, which always monitors the condition of the master power source 70, and signals output from the CODEC equipment 21 and the CODEC controller 12 are a low level. The low level signals indicate a normal condition. During normal operation, a low level control signal for realizing the control operation (a) is input to the switch 411 in the line control equipment 41 from the switching control equipment 31. Accordingly, the 48 kbits/sec multiplexed image data and the 16 kbits/sec voice signal are transmitted to the transmission line 90 and the signal received by the transmission line 90 is sent to the CODEC controller 12. The signal sent to the CODEC controller 12 is decoded by the CODEC equipment 11. The voice signal is sent to the voice input-output equipment 51 and is then recovered as the voice. The image signal decoded in the CODEC equipment 11 is output to display equipment 61 for display.

Next, operation under an irregular condition will be explained. An irregular condition is when the master power source 70 fails due to a power failure. The signal output from the monitor equipment 71 becomes a high level, informing the system that the master power source 70 has failed. In this case, partial video telephone operations are powered by the sub-power source. The normal encoding operation can be continued only for a short time period because the sub-power source 72 has a low power capacity. Therefore, the present invention automatically switches the CODECs 10 and 21 during the irregular operating condition. The term "switching" refers to the transfer of operations of the line control equipment 41 from the control operation (a) to the control operation (b) which was described previously. As already explained, power consumption of the CODEC 21 is considerably lower than that of the CODEC equipment 10. The CODEC equipment 21 can be sufficiently operated with power from the sub-power source 72. The control operation will be explained in detail.

A high level signal indicating an irregular condition of the master power source 70 is input to the switching control equipment 31 from the monitor equipment 71. The supply of power to the video telephone is then switched to the sub-power source 72. The switching control equipment 31 outputs a high level control signal to the switch 411 to request the switching of control from the control operation (a) to the control operation (b) mentioned above. The switch 411, upon receipt of the high level control signal, outputs the signal sent from the CODEC 21 to the transmitter 412 in place of the signal output from the CODEC equipment 10. The switch 411 also outputs, to the CODEC controller 12, a signal received by the receiver 413 from the transmission line 90. Therefore, voice communication can be sufficiently realized by the sub-power source 72 since switching is automatically carried out.

Figure 2:
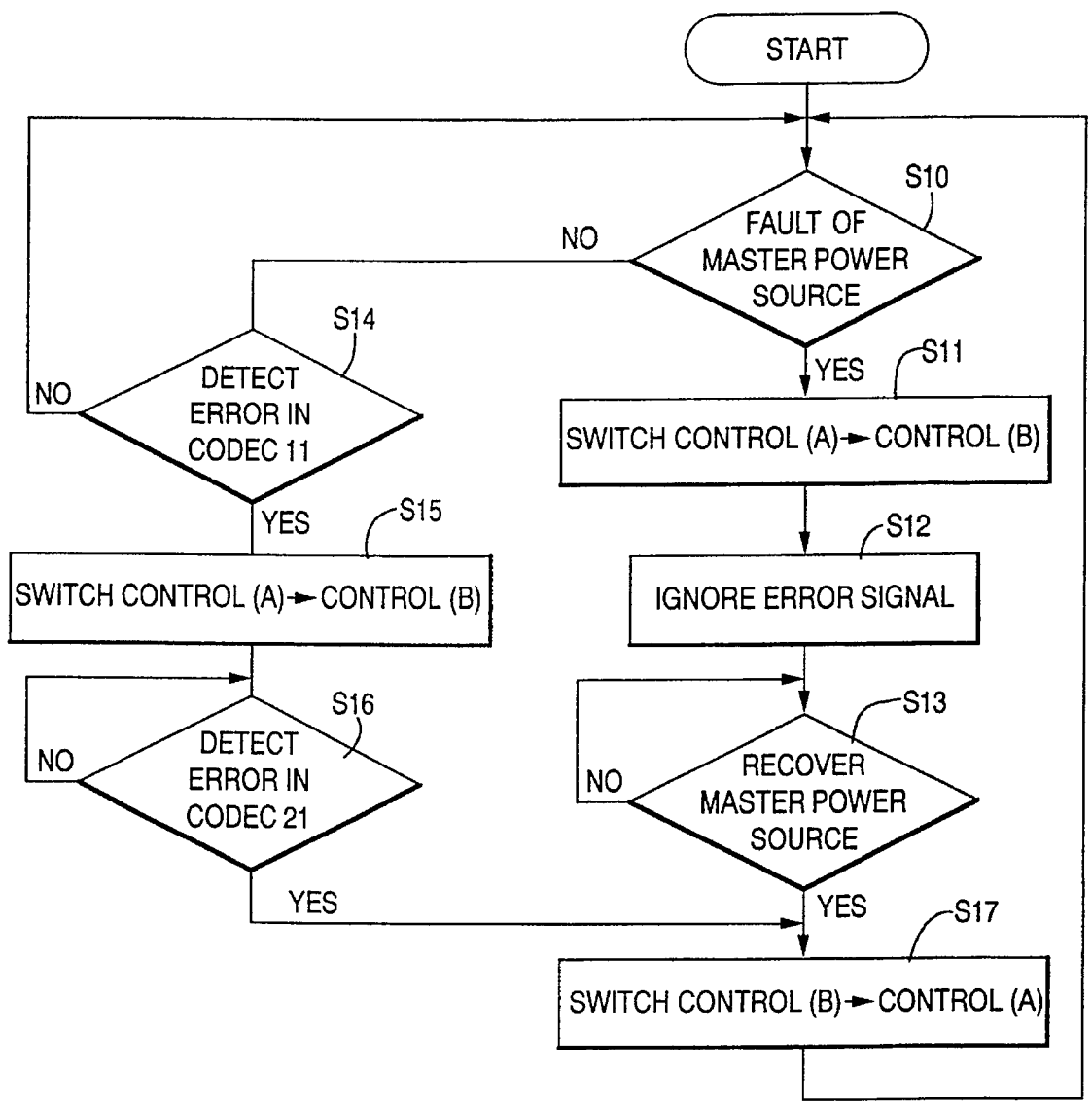
FIG. 2 is a flowchart for the operation of the switching control equipment shown in FIG. 1.
Figure 3:
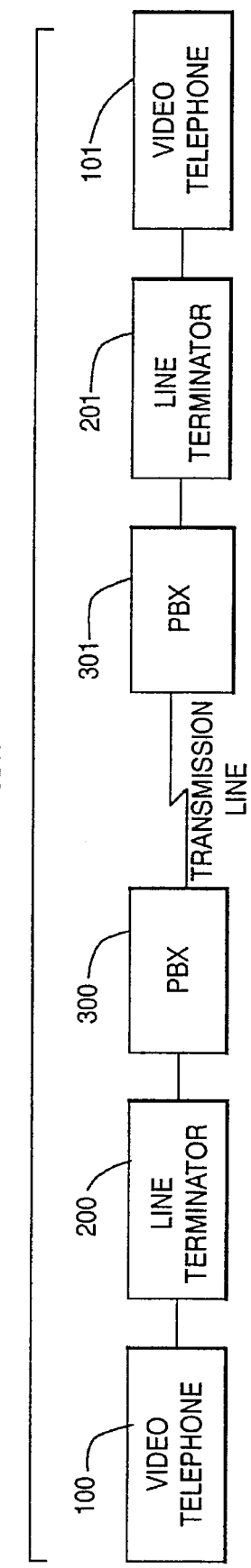
FIG. 3 is a block diagram of a communication system using a video telephone according to the present invention.

Next, communication between video telephones shown by the flowchart in FIG. 2 will be explained with reference to FIGS. 1 and 3. In FIG. 3, video telephones 100 and 101 are connected through line terminators 200 and 201 and Private Branch Exchangers (PBXs) 300 and 301, respectively. This system forms the ISDN with terminals, for example, a telephone set, facsimile, etc., and other transmission lines, which are not illustrated.

When the switching explained above is carried out in a first video telephone (i.e., video telephone 100), an error is generated in a second video telephone (i.e., video telephone 101) of a distant party. Meanwhile, since the signal encoded by the CODEC equipment 21 of the first video telephone is decoded in the CODEC equipment 10, an error, for example, an asynchronization error, is generated. Therefore, the present invention proposes a communication system between video telephones which realizes automatic switching of CODECs by video switching using the error signal.

In the second video telephone of the distant party, when an error signal is generated, a high level signal is output to the switching control equipment 31 through the CODEC controller 12. The switching control equipment 31 which receives the error signal outputs a high level signal to the switch 411 to request switching from the control operation (a) to the control operation (b). Upon receipt of the high level signal, the switch 411 outputs the signal from the receiver 413, which was received from the transmission line 90, to the CODEC equipment 21. The switch 411 also outputs the signal from the CODEC equipment 21 to the transmitter 412 in place of the signal from the CODEC equipment 10. The switching is automatically carried out between the video telephones and voice communication can be realized by the sub-power source 72.

When an irregular operating condition such as failure of the master power source is removed in, for example, the first telephone, the signal from the monitor equipment 71 becomes low level in the first telephone and the control operation (b) is switched to the control operation (a) by the line control equipment 41. Therefore, the video telephone returns to the normal operating condition. The signal from the CODEC equipment 10 having 64 kbits/sec is transmitted to the transmission line 90 in place of the signal from the CODEC 21. In this case, since one video telephone communicating with another video telephone conducts the control operation (b) by the line control equipment 41 as explained previously, an asynchronization error is generated in the CODEC equipment 21 due to the input signal encoded by the CODEC controller 12 and input to the CODEC equipment 21. Therefore, the control operation (b) in the line control equipment 41 can be switched to the control operation (a) by inputting the error signal to the switching control equipment 31. The video telephone is automatically switched to the intrinsic operating condition.

During the above operation, immediately after the operation is switched by the line control equipment 41 due to an irregular operating condition of the master power source 70, the signal encoded by the CODEC equipment 10 of the second video telephone is input, for example, to the CODEC equipment 21. Thus, an error is generated in the CODEC equipment 21 and it is input to the switching control equipment 31. The switching control equipment 31 ignores the error signal sent from the CODEC equipment 10 because the signal indicating an irregular operating condition of the master power source 70 is set to have the highest priority.

Here, the control operation of the switching control equipment 31 will be explained in detail with reference to the control flowchart shown in FIG. 2. In the first STEP 10), the signal indicating the condition of the master power source 70 is monitored. When failure is detected, operation proceeds to STEP 11. When failure is not detected the operation skips to STEP 14. In STEP 11), the signal for requesting switching from the control operation (a) to the control operation (b) to the line control equipment 41, is generated. In STEP 12), since the signal indicating the master power source 70 failure has a higher priority, a generated error signal is ignored. In STEP 13), it is determined whether the master power source 70 is operable. When it is operable, the operation skips to STEP 17. In STEP 14), it is determined whether there is an error from the CODEC 11. When an error is generated, operation proceeds to STEP 15.

In STEP 15), a control signal for requesting switching to the control operation (b) from the control operation (a) by the line control equipment 41 is generated. STEP 16) determines whether an error has been generated in the CODEC equipment 21. When the error is detected in the CODEC equipment 21, operation proceeds to STEP 17. In STEP 17), a control signal for requesting switching from the control operation (b) to the control operation (a) by the line control equipment 41 is generated and operation returns to STEP 10. The control operation for the switching control equipment 31 is then completed.

As explained above, the present invention automatically switches to a voice signal only communicating function from a voice and image signal communicating function and switches to the voice and image signal communicating function from the voice signal only communicating function.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A video telephone system transmitting and receiving voice and image signals at a bit transmission rate M over a transmission line connected thereto, said video telephone system comprising:

a master power source;

voice input-output means for generating a first voice signal and for receiving a second voice signal;

image pickup means for detecting a first image and for outputting a first image signal in dependence upon the first image;

display means for receiving a second image signal and for displaying a second image in dependence upon the second image signal;

first CODEC means for receiving a transmitted signal, for decoding the transmitted signal to produce the second voice signal, and for encoding the first voice signal to produce a first output signal at the bit transmission rate M;

second CODEC means for receiving the transmitted signal, for demultiplexing the transmitted signal to obtain a demultiplexed signal, for decoding the demultiplexed signal to obtain the second voice signal and the second image signal, for encoding the first voice signal to produce an encoded first voice signal at a bit rate N, for encoding the first image signal to produce an encoded first image signal at a bit rate L, where M=L+N, and for multiplexing the encoded first voice and image signals to obtain a second output signal; and switching control means for monitoring said master power source, for receiving the transmitted signal from the transmission line, for receiving the first output signal from said first CODEC means, for receiving the second output signal from said second CODEC means, for supplying the transmitted signal to said second CODEC means and the second output signal to the transmission line when said master power source is normal, and for supplying the transmitted signal to said first CODEC means and the first output signal to the transmission line when said master power source has failed.

2. A video telephone system as claimed in claim 1, wherein said switching control means supplies the first output signal and the second voice signal from said first CODEC means to the transmission line and said voice input-output means, respectively, if a fault has occurred in said second CODEC means, and wherein said switching control means supplies the second output signal and the second voice signal from said second CODEC means to the transmission line and said voice input-output means, respectively, if a fault has occurred in said first CODEC means.

* * * * *